United States Patent
Srinivasan et al.

(10) Patent No.: US 9,684,670 B2
(45) Date of Patent: Jun. 20, 2017

(54) MOVING SHARED FILES

(75) Inventors: Varun Srinivasan, Seattle, WA (US); Fernando Nahuel Viton, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 630 days.

(21) Appl. No.: 13/495,007

(22) Filed: Jun. 13, 2012

(65) Prior Publication Data

US 2013/0339420 A1 Dec. 19, 2013

(51) Int. Cl.
| | |
|---|---|
| G06F 15/16 | (2006.01) |
| G06F 17/30 | (2006.01) |
| H04L 29/08 | (2006.01) |
| H04L 29/06 | (2006.01) |

(52) U.S. Cl.
CPC ........ *G06F 17/30168* (2013.01); *H04L 29/06* (2013.01); *H04L 29/08072* (2013.01); *H04L 67/06* (2013.01)

(58) Field of Classification Search
CPC .......................... H04L 29/08072; H04L 29/06
USPC .......................... 709/220, 224, 228, 223, 225
See application file for complete search history.

(56) References Cited

U.S. PATENT DOCUMENTS

| | | | |
|---|---|---|---|
| 5,623,655 A | 4/1997 | Chisaka | |
| 6,757,710 B2* | 6/2004 | Reed | 709/203 |
| 7,047,291 B2* | 5/2006 | Breese et al. | 709/223 |
| 7,546,354 B1* | 6/2009 | Fan et al. | 709/219 |
| 7,546,602 B2* | 6/2009 | Hejlsberg | G06F 9/54 |
| | | | 717/114 |
| 8,769,127 B2* | 7/2014 | Selimis | H04L 67/06 |
| | | | 709/223 |
| 2004/0039721 A1 | 2/2004 | Tsuchiya | |
| 2005/0004978 A1* | 1/2005 | Reed et al. | 709/203 |
| 2005/0044075 A1* | 2/2005 | Steere et al. | 707/4 |
| 2007/0033191 A1* | 2/2007 | Hornkvist et al. | 707/9 |
| 2008/0022049 A1* | 1/2008 | Hughes | G06F 12/084 |
| | | | 711/130 |
| 2008/0095134 A1* | 4/2008 | Chen | H04B 7/2606 |
| | | | 370/342 |
| 2008/0177994 A1* | 7/2008 | Mayer | G06F 9/4418 |
| | | | 713/2 |
| 2008/0256532 A1 | 10/2008 | Xie et al. | |
| 2008/0306900 A1 | 12/2008 | Tamura | |

(Continued)

OTHER PUBLICATIONS

"Moving Files from One Shared Folder to Another", Retrieved at <<http://social.microsoft.com/Forums/zh/whssoftware/thread/9c484bc9-c09a-4f80-aeb2-9e3ec5922c31, Mar. 29, 2007, pp. 2.

(Continued)

*Primary Examiner* — Khanh Dinh
(74) *Attorney, Agent, or Firm* — Christopher J. Volkmann; Kelly, Holt & Christenson PLLC

(57) ABSTRACT

A client device accesses a shared data system and begins moving data from one location to another. The client device generates a tombstone object that indicates that includes metadata indicating that the data has been moved. When another client accesses the data at the old location, it encounters the tombstone and begins accessing the data at the new location. If the data has not already been completely moved to the new location, the second client to access the data assists in transferring the data to the new location.

17 Claims, 16 Drawing Sheets

(56) References Cited

U.S. PATENT DOCUMENTS

2010/0026612 A1* 2/2010 Yamamoto ........... G09G 3/3233
                                                     345/76
2010/0185587 A1   7/2010 Lovinger
2010/0327687 A1* 12/2010 Iannello ................ H02K 7/09
                                                     310/90.5
2011/0066808 A1*  3/2011 Flynn .................. G06F 12/0246
                                                     711/118

OTHER PUBLICATIONS

"Finding Missing or Moved Photos and Folders", Retrieved at <<http://www.computer-darkroom.com/Ir2_find_folder/find-folder.htm>>, Nov. 8, 2009, pp. 5.

"Administering Shared Folders", Retrieved at <<http://technet.microsoft.com/en-us/library/bb727040.aspx>>, Sep. 13, 2007, pp. 13.

* cited by examiner

MOVING SHARED FILES

BACKGROUND

There are many types of systems that allow users to share files. For instance, in some collaboration systems, a plurality of different users can access one or more different note taking applications and set up notebooks where the users can modify, contribute to, and share, information. The notebooks may have sections or folders, each of which contains a variety of different files. In these types of collaborative or shared systems, multiple clients or users can be working on a folder in a shared location, such as a network share location or on a web server.

It is also common in these types of shared systems for an entire notebook, folder, or portions of a folder, to be moved to a new location. When this occurs, other clients may attempt to write data to the old location, without being informed that the working set (the notebook, folder, etc.) has been moved to the new location. In addition, where multiple files are to be moved (such as where an entire folder is to be moved) the client may access the notebook when the folder has only been partially moved to the new location. Similarly, some clients may be offline when the move is initiated, so even if some type of notification system is in place that notifies clients that a folder is to be moved, the offline clients will not be notified of the move in a synchronous way.

Some have attempted to address this problem by relying on the server to send messages. In such a system, the server is required to keep sending messages to notify clients of the change of location. However, this often requires changes to both the server and client which may not be feasible. Similarly, this does not support older clients that have already been released.

Still others have attempted to address this problem by manually generating electronic mail (or other messages) to the clients that work on the shared system. However, this often requires a person to accurately generate electronic mail messages to all users. This is cumbersome and can also be error prone.

The discussion above is merely provided for general background information and is not intended to be used as an aid in determining the scope of the claimed subject matter.

SUMMARY

A client device accesses a shared data system and begins moving data from one location to another. The client device generates a tombstone object that includes metadata indicating that the data has been moved. When another client accesses the data at the old location, it encounters the tombstone and begins accessing the data at the new location. If the data has not already been completely moved to the new location, the second client to access the data assists in transferring the data to the new location.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
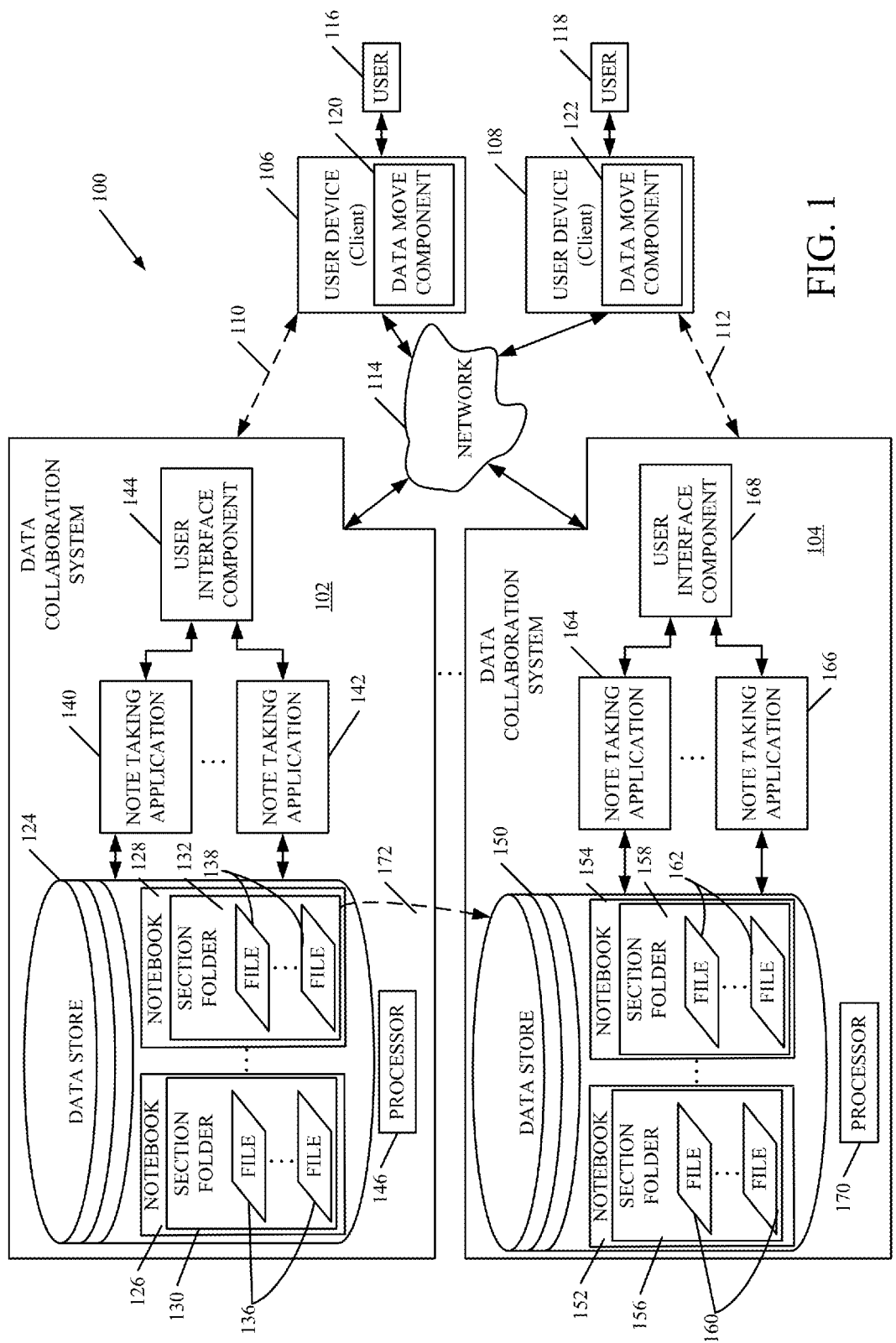
FIG. 1 is a block diagram of one illustrative data system.

FIG. 1 is a block diagram of a data system 100. Data system 100 includes data collaboration system (or shared data system) 102 and data collaboration system (or shared data system) 104. User devices (or clients) 106 and 108 are coupled to data collaboration systems 102 and 104 either directly (as indicated by arrows 110 and 112) or through a network 114. In the embodiment shown, users 116 and 118 access systems 102 and 104, using user devices 106 and 108. FIG. 1 also shows that each user device 106 and 108 has a data move component 120 and 122, respectively.

In the embodiment shown in FIG. 1, data collaboration system 102 includes data store 124 that has a plurality of notebooks 126 and 128. Each notebook has at least one folder 130 and 132, and each folder has one or more files 136 and 138, respectively. System 102 also includes one or more note taking applications 140 and 142 that generate user interfaces for display on user devices 106 and 108, using user interface component 144. Note taking applications 140 and 142 maintain the notebooks 126 and 128 in data store 124, and the user interfaces allow users 116 and 118 to collaborate (such as to add, delete, modify, create, save, etc.) or shared data in the files or folders of notebooks 126 and 128.

It will be appreciated that each notebook, itself, could be a folder, while each section could be a file. Folders and files can be configured in other ways as well, where a folder contains one or more files. The folder construct can be named other things such as a notebook, a section, a collection, a notepad or other things. In fact, while the data collaboration system described herein discusses note taking applications with notebooks, this is exemplary only. Other shared data systems can be used as well, or instead. The present discussion is provided with a notebook having section folders for the sake of example only.

In the embodiment shown in FIG. 1, data collaboration system 102 also includes processor 146. In one embodiment, processor 146 is a computer processor with associated memory and timing circuitry (not shown). Processor 146 is illustratively a functional component of system 102 and is activated by, and facilities the functionality of, the various other applications and components in system 102.

FIG. 1 shows that data collaboration system 104 is similar to data collaboration system 102, in that it includes a data store with notebooks and section folders that each contain files. More specifically, it includes a data store 150 that includes notebooks 152 and 154, each of which include section folders 156 and 158. Folders 156 and 158 also each include files 160 and 162. System 104 also includes a plurality of note taking applications 164 and 166, along with a user interface component 168 and processor 170. It will be noted that while systems 102 and 104 are shown with note taking applications, this is shown by way of example only.

They could be provided with substantially any other type of data collaboration systems or shared data systems that allow a plurality of different users to collaborate on, or share, stored data.

In one embodiment, one of the users uses his or her client device to initiate a move of a folder from one location in either system 102 or 104 to another location. For the sake of the present discussion, it will be assumed that user 116 wishes to initiate a move of folder 132 from its current location in data store 124 in data collaboration system 102 to a new location in data store 150 in data collaboration system 104. User 116 does this by using data move component 120 in user device 106. Moving folder 132 is indicated by arrow 172 in FIG. 1.

Figure 2:
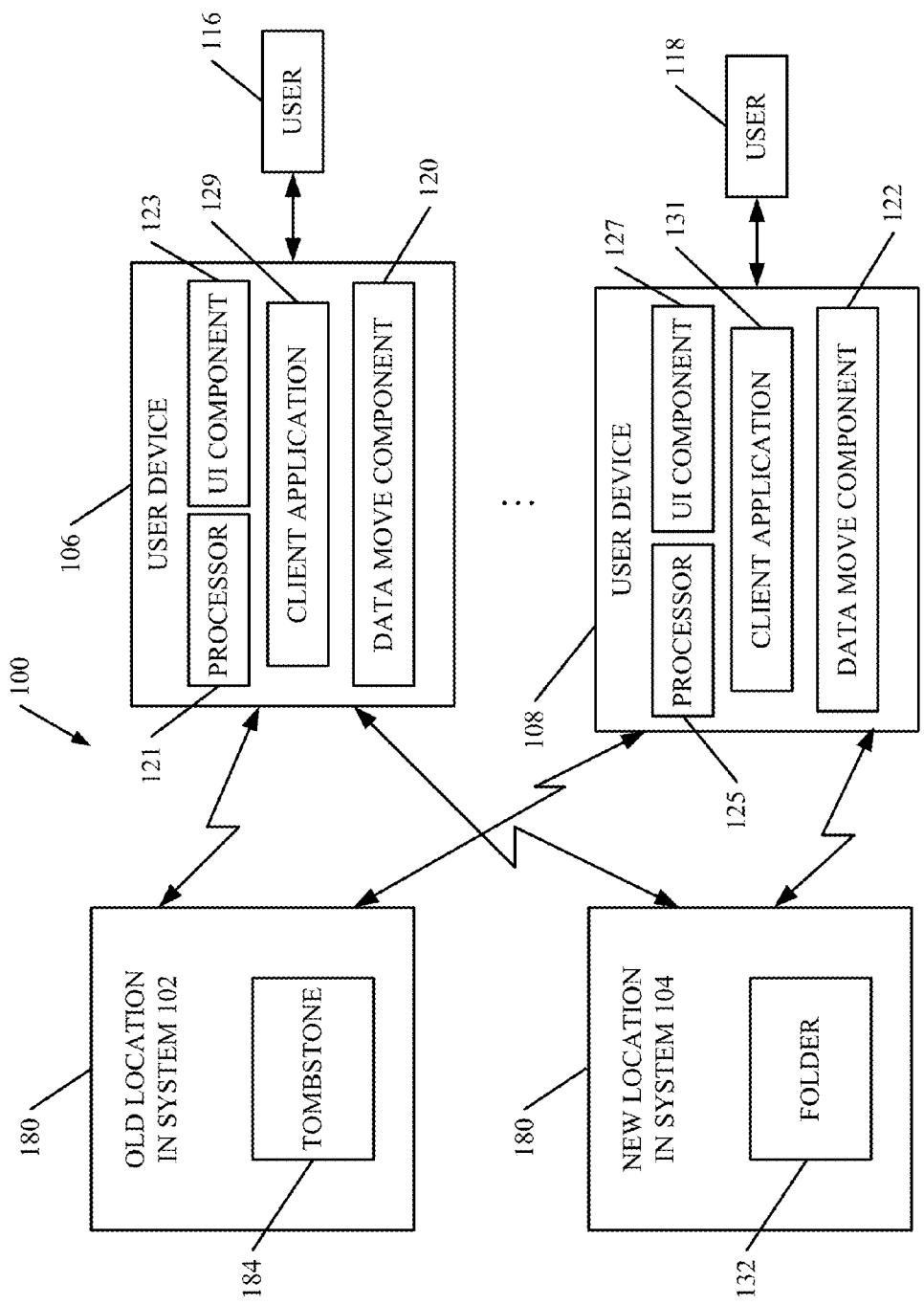
FIG. 2 illustrates user devices that can transmit data from an old location to a new location.

FIG. 2 is a simplified block diagram of system 100 (shown in FIG. 1), and similar items are similarly numbered. However, FIG. 2 shows user devices 106 and 108 in more detail. Specifically, FIG. 2 shows that user devices 106 and 108 each have a processor 121 and 125 that is a functional component of its device and is activated by, and facilitates the functionality of, other applications and components of its corresponding device 106 and 108. FIG. 2 also shows that devices 106 and 108 each have a UI component 123 and 127, respectively, for generating user interface displays with user input mechanisms for receiving user inputs, and client applications 129 and 131 that can be client components of the note taking applications 140, 142, 164 and 166 or other applications.

The operation of data move component 120 in initiating a move of folder 132 from its old location 180 in system 102 to its new location 182 in system 104 is described in greater detail below with respect to FIGS. 5-5D. Briefly, before describing the operation in detail, the user 116 indicates that he or she wishes to move folder 132 from the old location 180 to the new location 182. This is illustratively done by device 106 generating a suitable user interface display using user interface component 123 that displays user input mechanisms that allow user 116 to interact with data move component 120. In response to user 116 indicating that he or she wishes to move folder 132 to its new location 182, data move component 120 generates a tombstone 184 at the old location, and then begins moving the files in folder 132 to new location 182. In one embodiment, tombstone 184 includes metadata that can be read by client application 129 or 131 on a user device that attempts to access folder 132 at the old location, after the move has been initiated.

Figure 3:
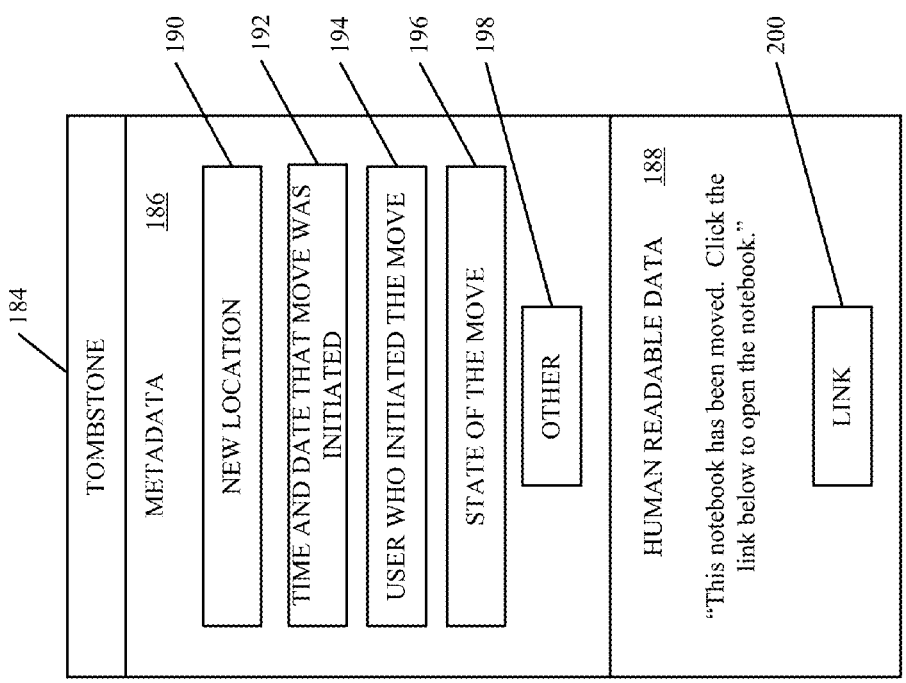
FIG. 3 shows one embodiment of a tombstone.

One embodiment of tombstone 184 is illustrated in FIG. 3. It can be seen in FIG. 3 that the embodiment of tombstone 184 includes a metadata portion 186 and a human readable portion 188. Metadata portion 186 illustratively includes an identity of new location identifier 190 that identifies the new location 182, time and date information 192 that indicate the time and date that the move was initiated, a user identifier 194 that identifies the user that initiated the move, and a status indicator 196 that indicates whether the move has been completed, or whether it is in process. Of course, metadata in portion 186 can include other data 198 as well.

The embodiment shown in FIG. 3 illustrates that the human readable data portion 188 in tombstone 184 includes a message that can be displayed to another user that attempts to access folder 132 in the old location 180. In one embodiment, where the user's device is not equipped with a version of the client application 129, 131 that can read metadata in metadata portion 186, the message in human readable data portion 188 is displayed to the user. In the embodiment shown in FIG. 3, the human readable data simply states "This notebook has been moved. Click the link below to open the notebook." Human readable data portion 188 includes an actuatable link 200 which, when actuated by the user, navigates the user to the new location of the notebook or folder 132.

Figure 4:
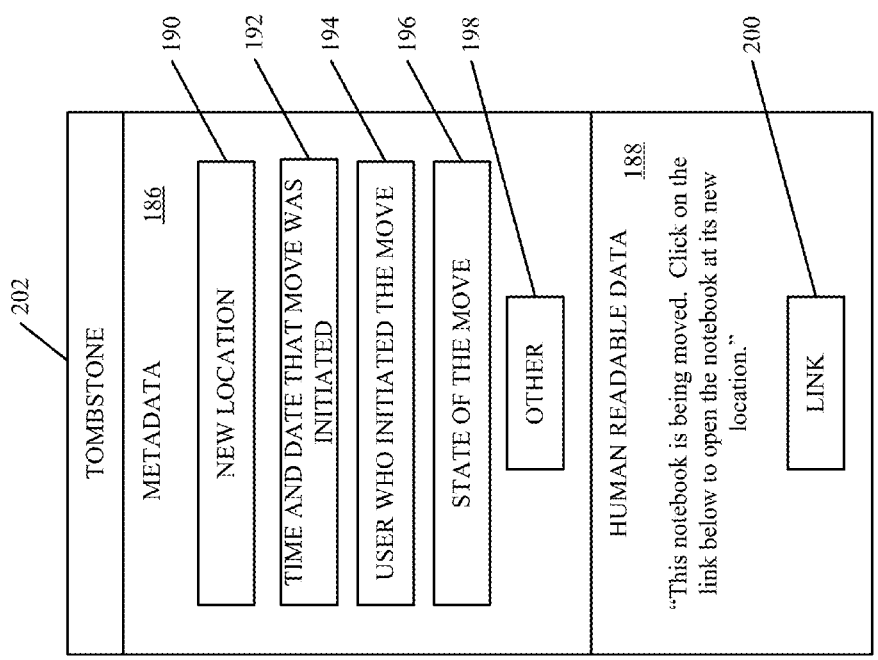
FIG. 4 shows another embodiment of a tombstone.

FIG. 4 is another embodiment of a tombstone 202 which is similar to tombstones 184 shown in FIG. 3, and similar items are similarly numbered. However, for the embodiment shown in FIG. 4, the entire folder 132 has not yet been moved to its new location, but instead the move is still in progress. Therefore, the information in status indicator 196 will indicate that the move is still in progress, and the human readable message will be changed to indicate this as well. In the embodiment shown in FIG. 4, the human readable message states "This notebook is being moved. Click on the link below to open the notebook at its new location." Of course, these are exemplary embodiments of tombstone 184 and 200, and others could be generated as well.

Figure 5:
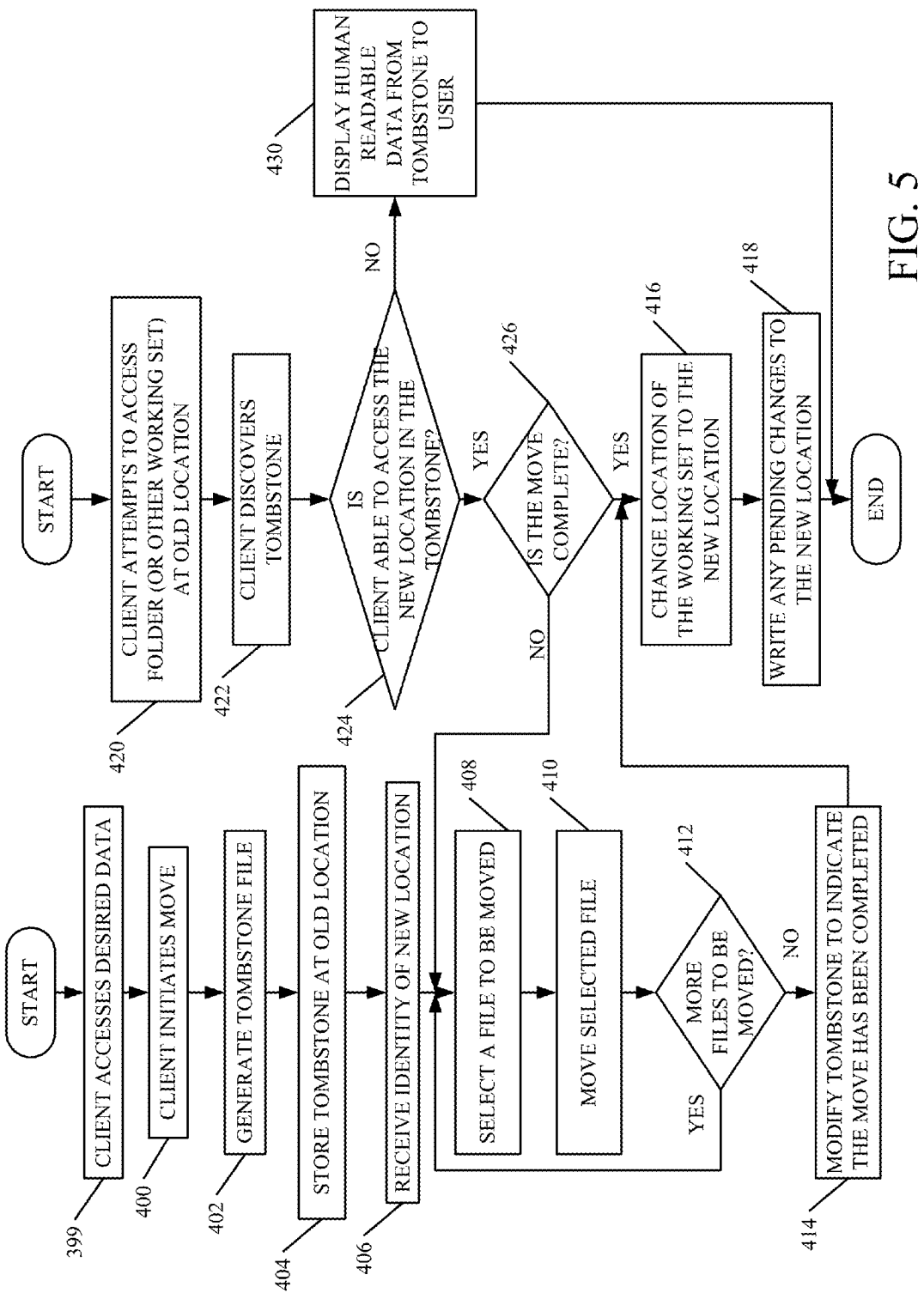
FIG. 5 is a flow diagram illustrating one embodiment of the operation of the system shown in FIG. 1 in moving data.
Figure 5A:
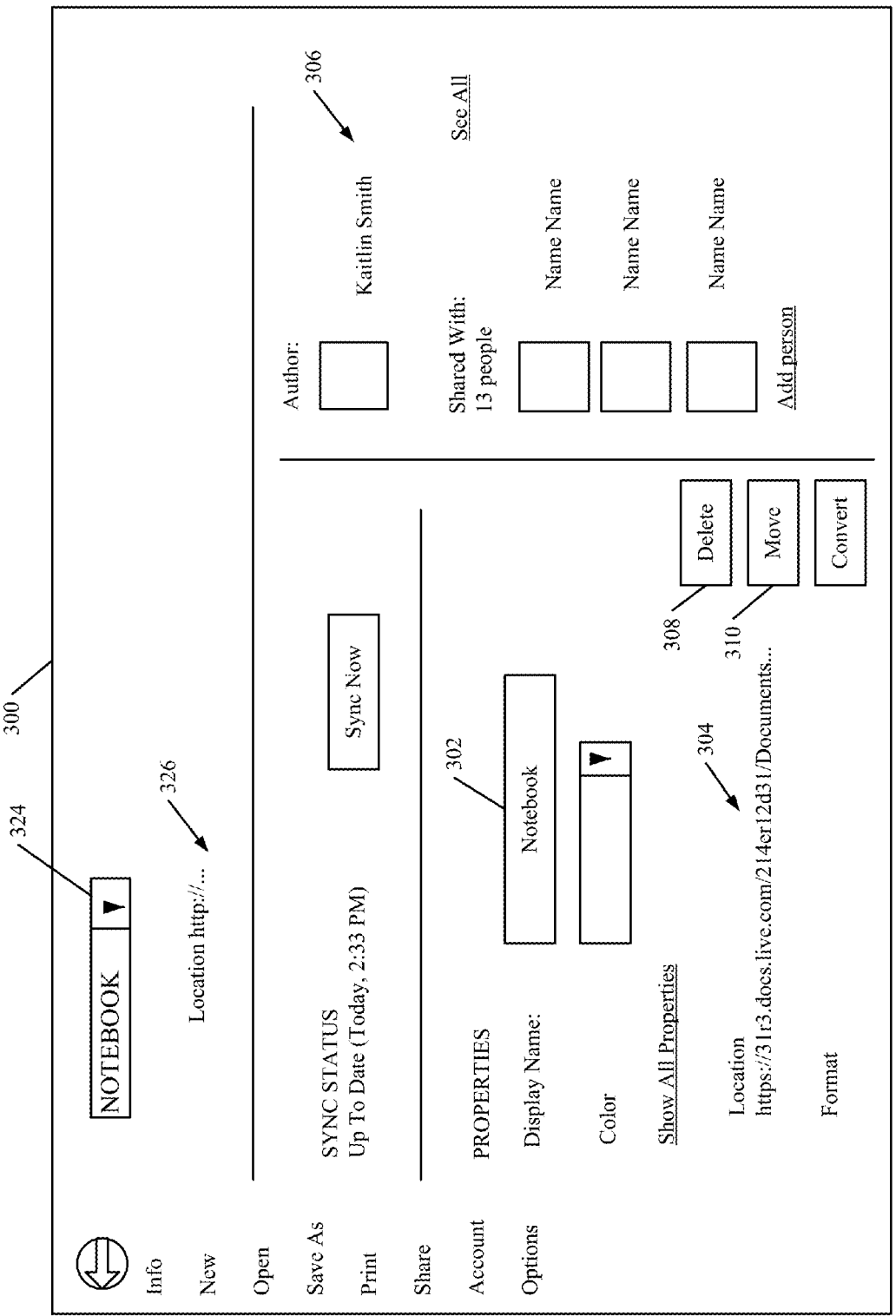
FIGS. 5A-5D are illustrative user interface displays.

FIG. 5 is a flow diagram illustrating the operation of user devices 106 and 108 in moving folder 132 from its old location 180 in system 102 to its new location 182 in system 104, in greater detail. FIGS. 5A-5D are illustrative user interface displays that are generated by the user interface components 123 and 127 and allow a user to initiate the move of a folder. FIGS. 5-5D will now be described in conjunction with one another. The description will proceed with respect to user 116 initiating a move with user device 106. However, this is, of course, exemplary only and other users can initiate the move as well.

User 116 first provides an input, through a suitable user input mechanism generated by UI component 123, indicating that the user wishes to access folder 132. Then, in one embodiment, client application 129 generates a user interface display, using UI component 123, such as user interface display 300 shown in FIG. 5A. User interface display 300 shows a variety of different information corresponding to a notebook whose name is displayed in a text box 302. The location of the given notebook is also indicated at location display portion 304. In addition, the author of the notebook and the various other users of the notebook, for example, are indicated generally at 306. Accessing the desired data (in this case folder 132) is indicated by block 399 in FIG. 5. In the embodiment shown in FIG. 5A, the user is provided with a delete button 308 and a move button 310. Delete button 308 allows the user to delete a notebook or other data while move button 310 allows the user to initiate the move of a notebook, or a portion of the notebook, to a new location. The user 116 illustratively actuates button 310. This can be done in a wide variety of different ways. For instance, where the display screen of user device 106 is a touch sensitive display screen, the user 116 can actuate button 310 simply by touching it either with the user's finger or with a stylus or with another item. Of course, the user 116 can also actuate button 310 in other ways, such as by using a point and click device, by using voice commands, by using other touch gestures, etc. This input is provided to data move component 120 which is then initiated to begin moving folder 132 from old location 180 to new location 182. Having the client initiate the move is indicated by block 400 in FIG. 5.

As the client is attempting to initiate the move at block 400, it may be desirable to ask the user for credentials or authorization to ensure that this particular user has the authority to move the folder. This can be done as well.

Figure 5B:
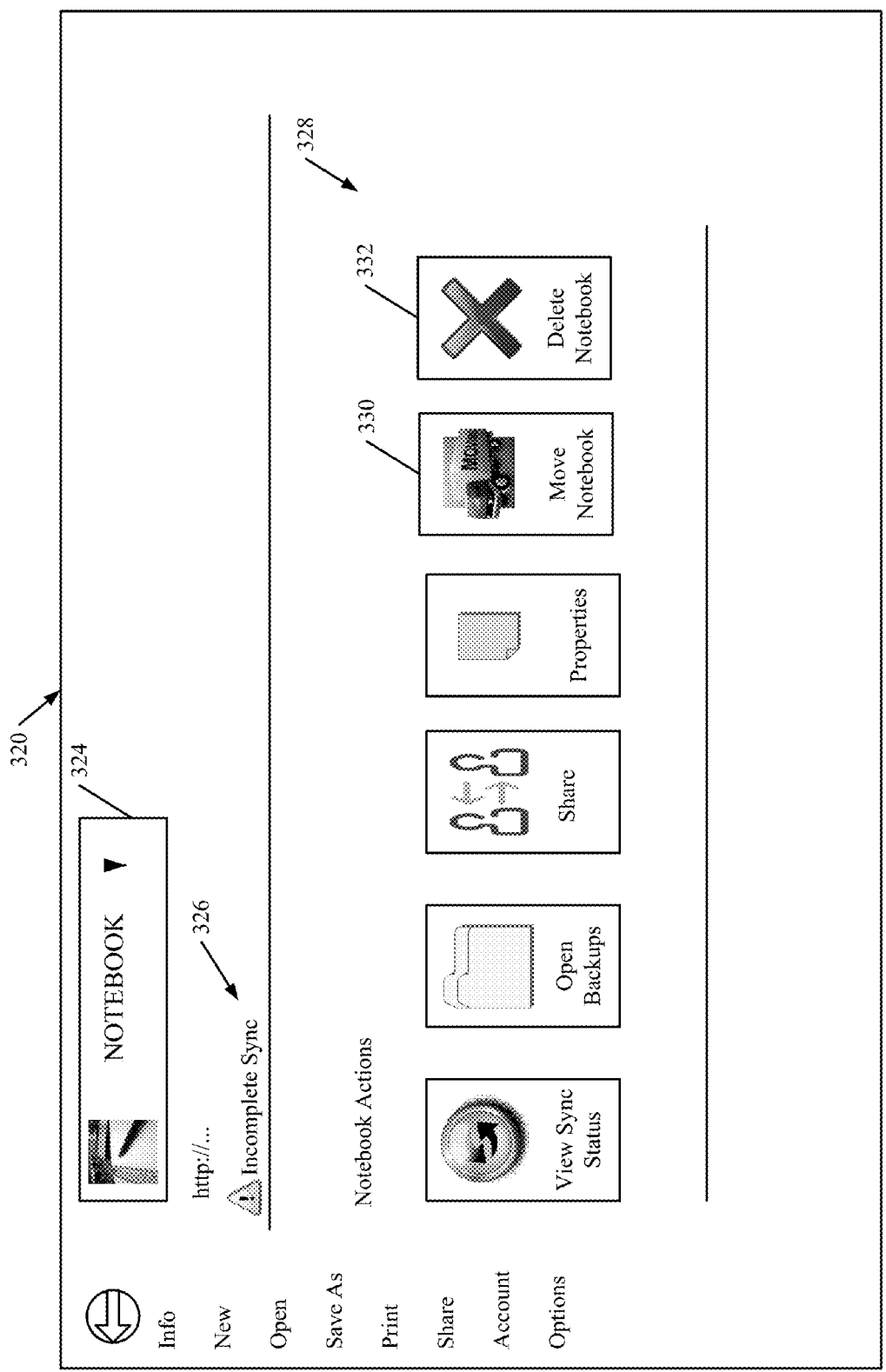

FIG. 5B shows an alternative user interface display 320. Display 320 allows a user to choose a notebook using a suitable user input mechanism, such as dropdown menu 324. Once the user has chosen the notebook, the location for that notebook is indicated generally at 326. Display 320 also provides a plurality of buttons 328 that allow the user to perform certain actions with respect to the notebook displayed in dropdown menu 324. Among the buttons 328 are move button 330 and delete button 332. When the user actuates delete button 332, the user can delete the notebook. If the user actuates button 330, the user can initiate a move of the notebook from its current location to a new location.

Once a move has been initiated, data move component 120 generates tombstone 184 at the old location of folder 132. This is indicated by block 402 in FIG. 5. Recall that two exemplary embodiments of tombstones are described above with respect to FIGS. 3 and 4. Once the tombstone is generated by data move component 120, it is stored in the old location 180, and this is indicated by block 404.

Figure 5C:
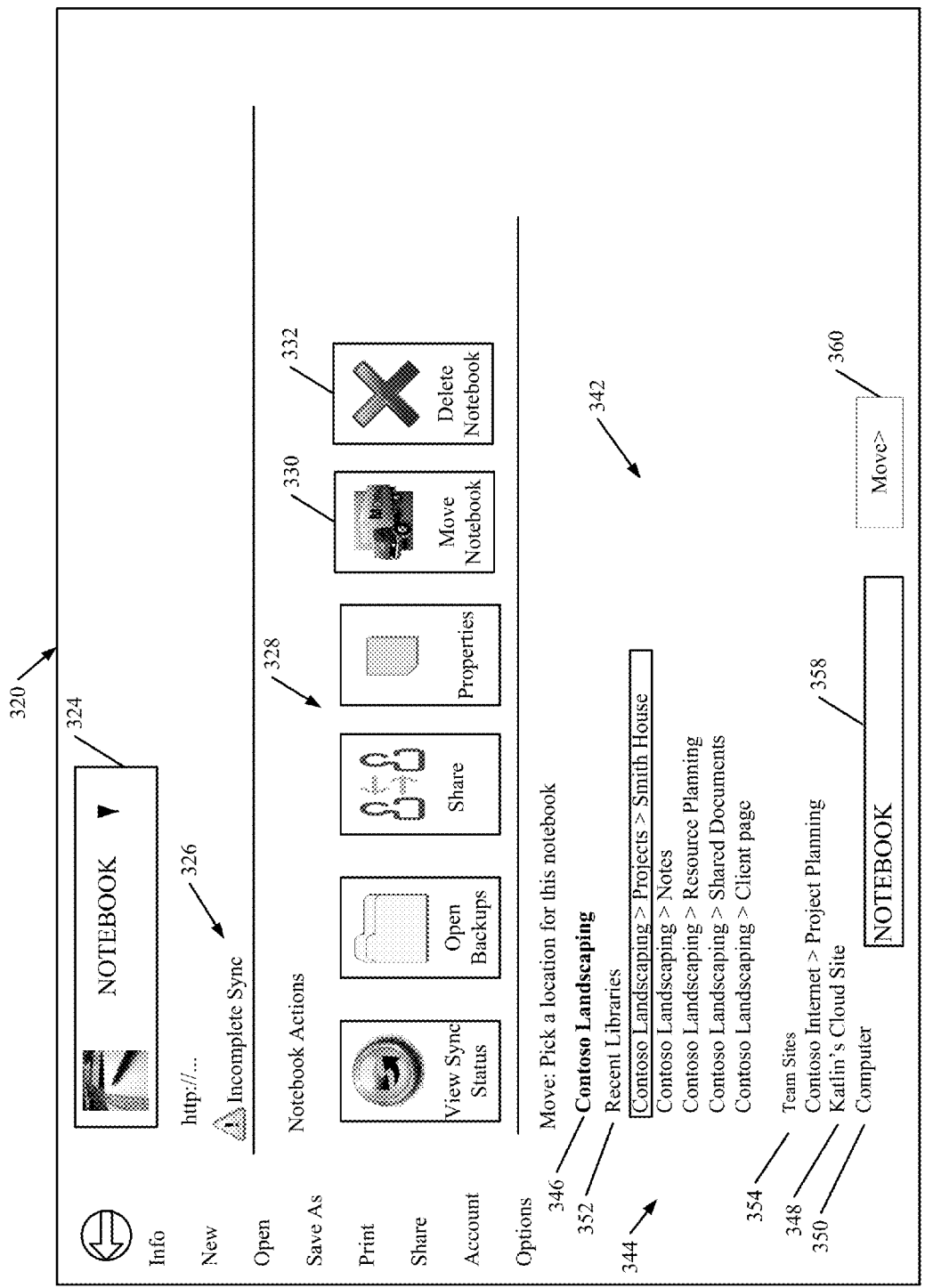

User device 106 then generates a user interface display using component 123 that allows the user to input the identity of the new location for the file to be moved. FIG. 5C shows one embodiment of a user interface display 340 that has some similar items to user interface display 320 shown in FIG. 5B, and those items are similarly numbered. User interface display 340 shows some new locations that can be selected by the user, and these are generally indicated at 342. In the embodiment shown in FIG. 5C, the new locations 342 are listed in a new locations list 344 that includes a plurality of different portions. List 344 is shown broken out by general location, such as a location corresponding to a given project (in this case Contoso Landscaping) shown at 346, an individual user's cloud site 348 and a general computer location 350. If the user selects one of items 346, 348 and 350, the list corresponding to the selected item expands. In the embodiment shown in FIG. 5C, the user has selected the Contoso Landscaping item 346. Therefore, the locations corresponding to that item are divided into two sections including a recent libraries section 352 and a team sites section 354. This list is also scrollable using a scroll bar 356. Therefore, the user can scroll through different possible new locations and select one of them. Once the new location is selected, it is listed in a new location text box 358 and the user can begin the move by pressing move button 360. Receiving a user input indicative of the identity of the new location is indicated by block 406 in FIG. 5. It will of course be appreciated that the described way of selecting a new location is exemplary only and a wide variety of other ways, other users input mechanisms and other displays can be used as well.

Once the new location is input or chosen by the user, the tombstone (184 or 202) is updated with a link to that new location and the tombstone metadata is updated to indicate that location as well. Of course, in another embodiment, the tombstone (184 or 202) is not created and stored in the old location until after the user has input or chosen the new location and actuated move button 360. The present description is exemplary only.

Once the user has actuated move button 360, data move component 120 selects one of the files in folder 132 and moves the selected files from the old location 180 to the new location 182. Selecting a file and moving the file are indicated by blocks 408 and 410 in FIG. 5. Data move component 120 then determines whether there are more files to be moved, at block 412. If so, processing reverts to block 408 where component 120 selects another file to be moved and moves that file.

It will be appreciated that, as long as there are still files to be moved in the selected folder 132, the tombstone stored at the old location will be tombstone 202 and will indicate the new location of folder 132, the time and date that the move was initiated, the user who initiated the move, and the status indicator 196 will indicate that the move is still in progress. Human readable data 188 will indicate this as well. However, if, at block 412, it is determined that all of the files have been moved, then data move component 120 modifies the tombstone 202 to be tombstone 184 and to indicate that the move has been completed. This is done by illustratively modifying the status indicator 196 and the human readable data 188 to indicate that the move has been completed. This is indicated by block 414 in FIG. 5. It will also be appreciated that, while the move is in process, data move component 120 may lock the files in folder 132 during the move. Any changes by a client or other user device will be held locally on that client or user device until the move has been completed.

Figure 5D:
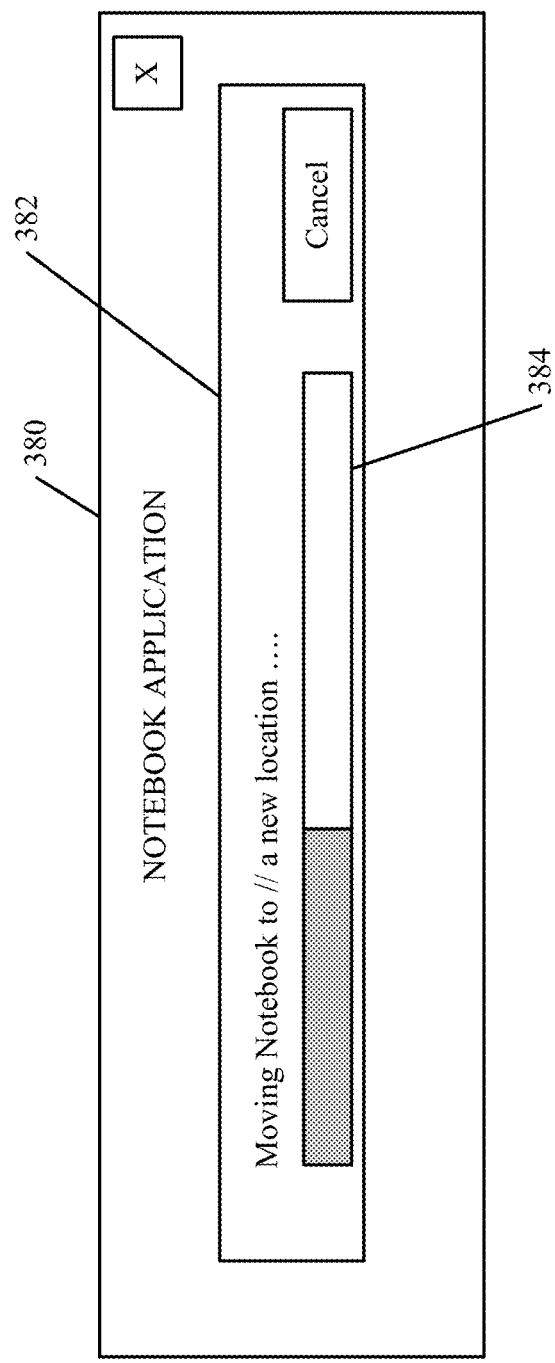

During the move, data move component 120 can generate a progress bar display such as that shown in user interface display 380 in FIG. 5D. The progress bar display 380 illustratively shows the new location for the notebook (or folder) at 382 and provides a status bar 384 that indicates the progress of the move to the new location.

Once the move has been completed, data move component 120 modifies application 129 so that the location of the working set (in this case folder 132) is set to the new location 182. This is indicated by block 416 in FIG. 5. Any pending changes that have been made during the move are then written to the working set at the new location 182. This is indicated by block 418 in FIG. 5.

It may happen that, either during the move of folder 132 or after it, a different client device (such as user device 108) attempts to access folder 132 at the old location 180. Because the user device 108 itself has a data move component 122, user device 108 will discover the tombstone (184 or 202) at the old location. Having device 108 attempt to access the folder at the old location 180 and having it subsequently discover tombstone (184 or 202) is indicated by blocks 420 and 422 in FIG. 5.

In an embodiment where data move component 122 is configured to read the metadata in metadata portion 186 of tombstone 184 or 202, data move component 122 can read the status indicator 196 to determine whether the move has been completed. This is indicated by blocks 424 and 426 in FIG. 5. If not, then data move component 122, itself, begins to assist in moving folder 132 from its old location 180 to the new location 182. In doing so, data move component 122 of user device 108 begins processing at block 408 discussed above. Thus, data move component 122 on user device 108 selects a file to be moved and moves the selected file and then determines whether there are still more files to be moved. This is indicated by blocks 408, 410 and 412. This continues until there are no more files to be moved (at which point the move is complete) or until device 108 is off line (in which case it stops helping with the move). The particular data move component 120 or 122 that moves the last file updates the status indicator 196 in tombstone 202 to indicate that the move is now complete. Processing then continues at blocks 414, 416 and 418.

Once the files in folder 132 have been completely moved, it may be desirable to delete them from the old location as well. Therefore, the data move component that moves the last file may optionally delete the old files from the old location.

It may happen that a particular data move component 120 or 122 is not configured to read the metadata in the tombstone 184 or 202. This may happen, for instance, where the particular data move component is an older version or has simply not been setup to read the metadata. In that case, at block 424, the given user device 108 will simply display the human readable data from tombstone 184 or 202 to the user. This is indicated by block 430 in FIG. 5. Thus, the user will see the displayed message "This notebook has been moved. Click the link below to open the notebook." (where the move has been completed). Alternatively, if the move has not yet been completed, the user will be shown the message illustrated in FIG. 4 which states "This notebook is being moved. Click on the link below to open the notebook at its new location." Of course, these are exemplary messages only and others could be used as well.

Figure 6:
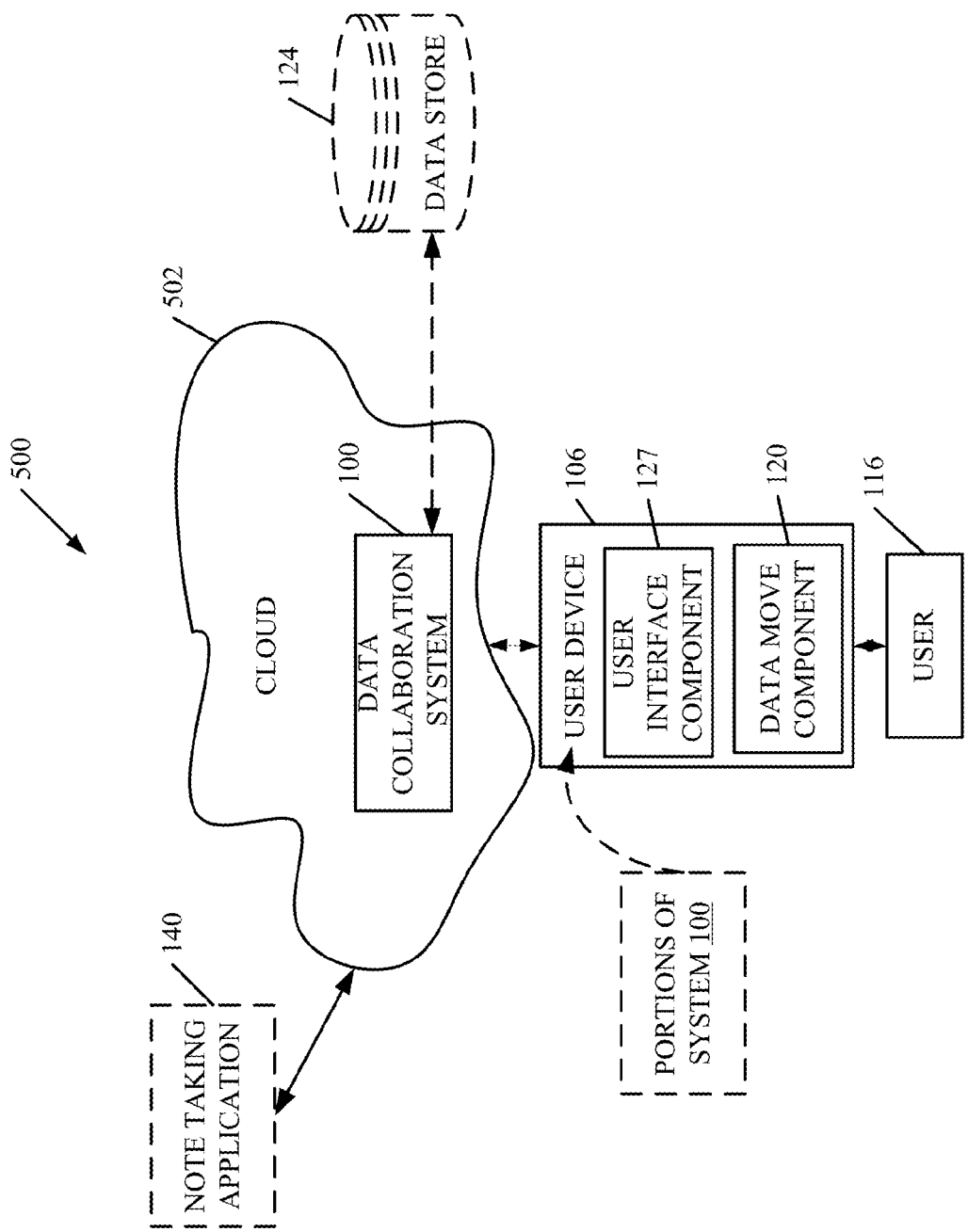
FIG. 6 shows various architectures in which the system of FIG. 1 can be employed.

FIG. 6 is a block diagram of system 100, shown in various architectures, including cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of system 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

The embodiment shown in FIG. 6, specifically shows that system 100 is located in cloud 502 (which can be public, private, or a combination where portions are public while others are private). Therefore, user 116 uses a user device, such as user device 106, to access those systems through cloud 502.

FIG. 6 also depicts another embodiment of a cloud architecture. FIG. 6 shows that it is also contemplated that some elements of system 100 are disposed in cloud 502 while others are not. By way of example, data store 124 can be disposed outside of cloud 502, and accessed through cloud 502. In another embodiment, some or all of the components of system 100 (such as note taking application 140 or other portions) are also outside of cloud 502. Regardless of where they are located, they can be accessed directly by device 106, through a network (either a wide area network or a local area network), they can be hosted at a remote site by a service, or they can be provided as a service through a cloud or accessed by a connection service that resides in the cloud. All of these architectures are contemplated herein.

FIG. 6 further shows that some or all of the portions of system 100 can be located on device 106.

It will also be noted that system 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
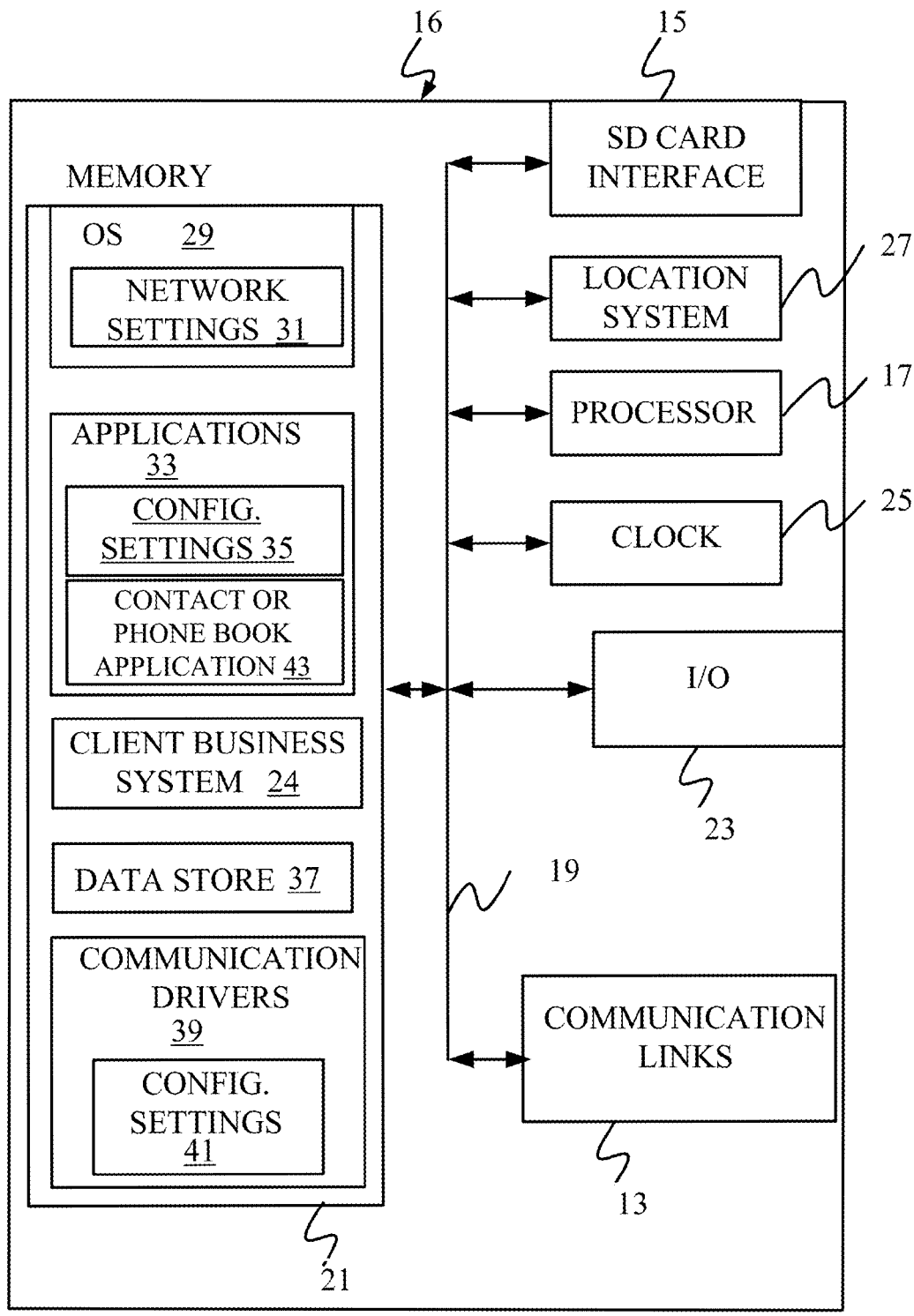
FIGS. 7-11 illustrate various embodiments of mobile devices.

FIG. 7 is a simplified block diagram of one illustrative embodiment of a handheld or mobile computing device that can be used as a user's or client's hand held device 16, in which the present system (or parts of it) can be deployed. In one embodiment, device 16 can comprise one or more of user devices 106 or 108 but it can also comprise a collaboration system 102 or 104 as well. FIGS. 7-11 are examples of handheld or mobile devices.

FIG. 7 provides a general block diagram of the components of a client device 16 that can run components of system 100 or that interacts with system 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems (like system 100) are received on a removable Secure Digital (SD) card that is connected to a SD card interface 15. SD card interface 15 and communication links 13 communicate with a processor 17 (which can also embody one of processors 146, 170, 121 or 125 from FIGS. 1 and 2) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. System 100 or the items in data store 124, for example, can reside in memory 21. Similarly, device 16 can have a client business system 24 which can run various applications (such as application 140 or 129) or embody parts or all of system 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications (such as application 140 or 129) that have previously been stored on the device 16 or applications that are installed during use, although these can be part of operating system 29, or hosted external to device 16, as well.

Figure 8:
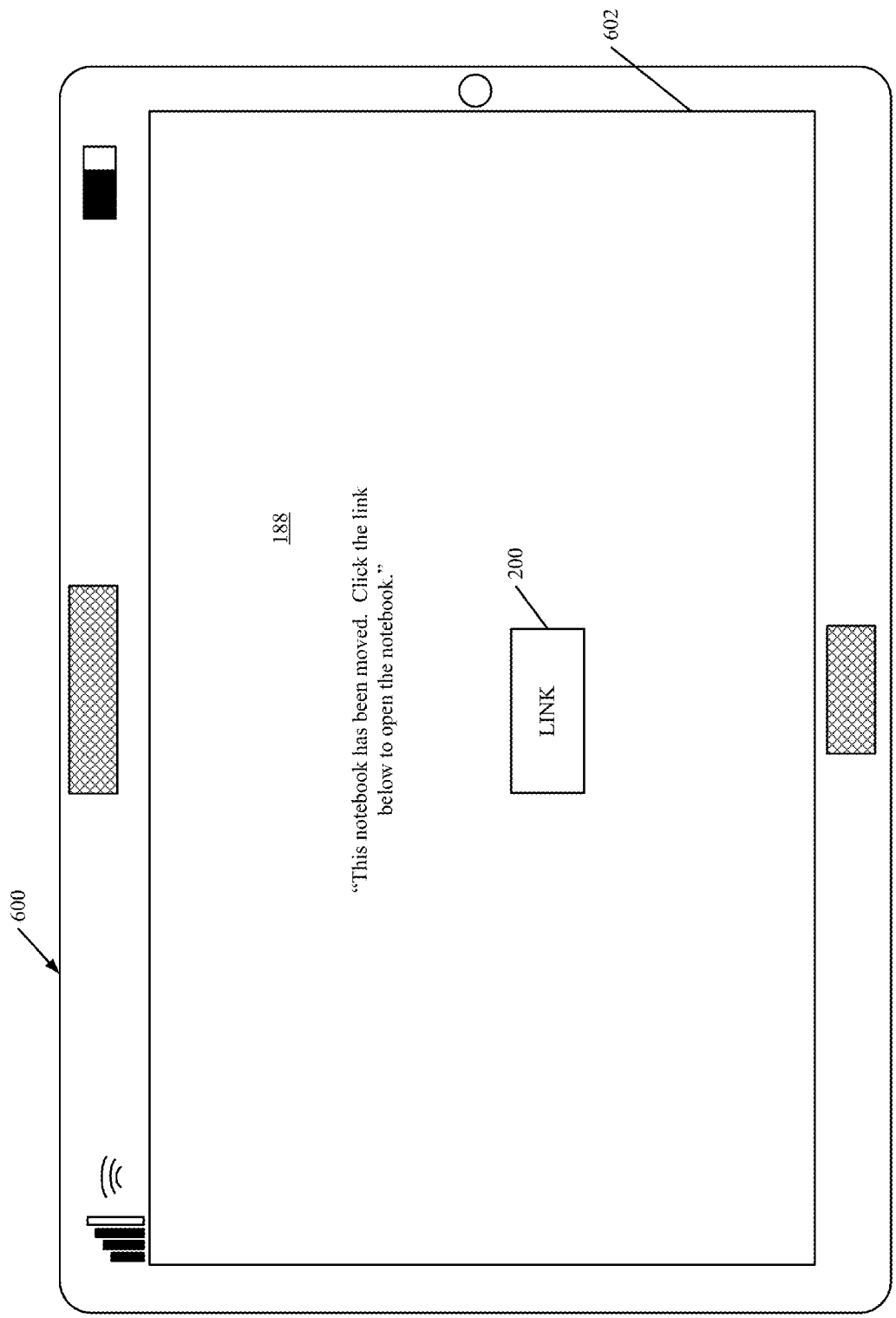
Figure 9:
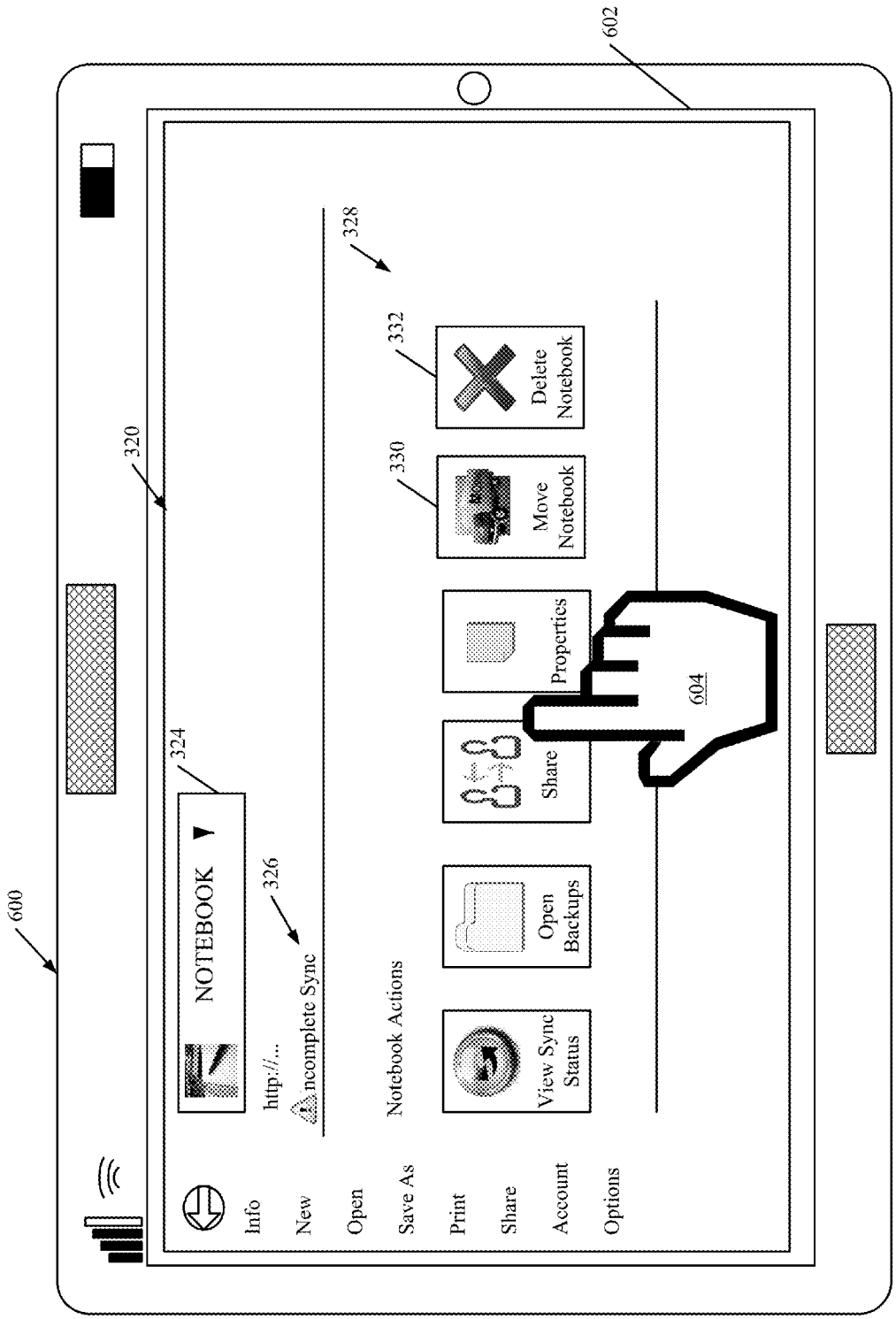

FIG. 8 and show one embodiment in which device 16 is a tablet computer 600. In FIG. 8, computer 600 is shown with display screen 602 showing the display of FIG. 3 while FIG. 9 shows computer 600 with display screen 602 showing the display of FIG. 5B. Screen 602 can be a touch screen (so touch gestures from a user's finger 604 can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Figure 10:
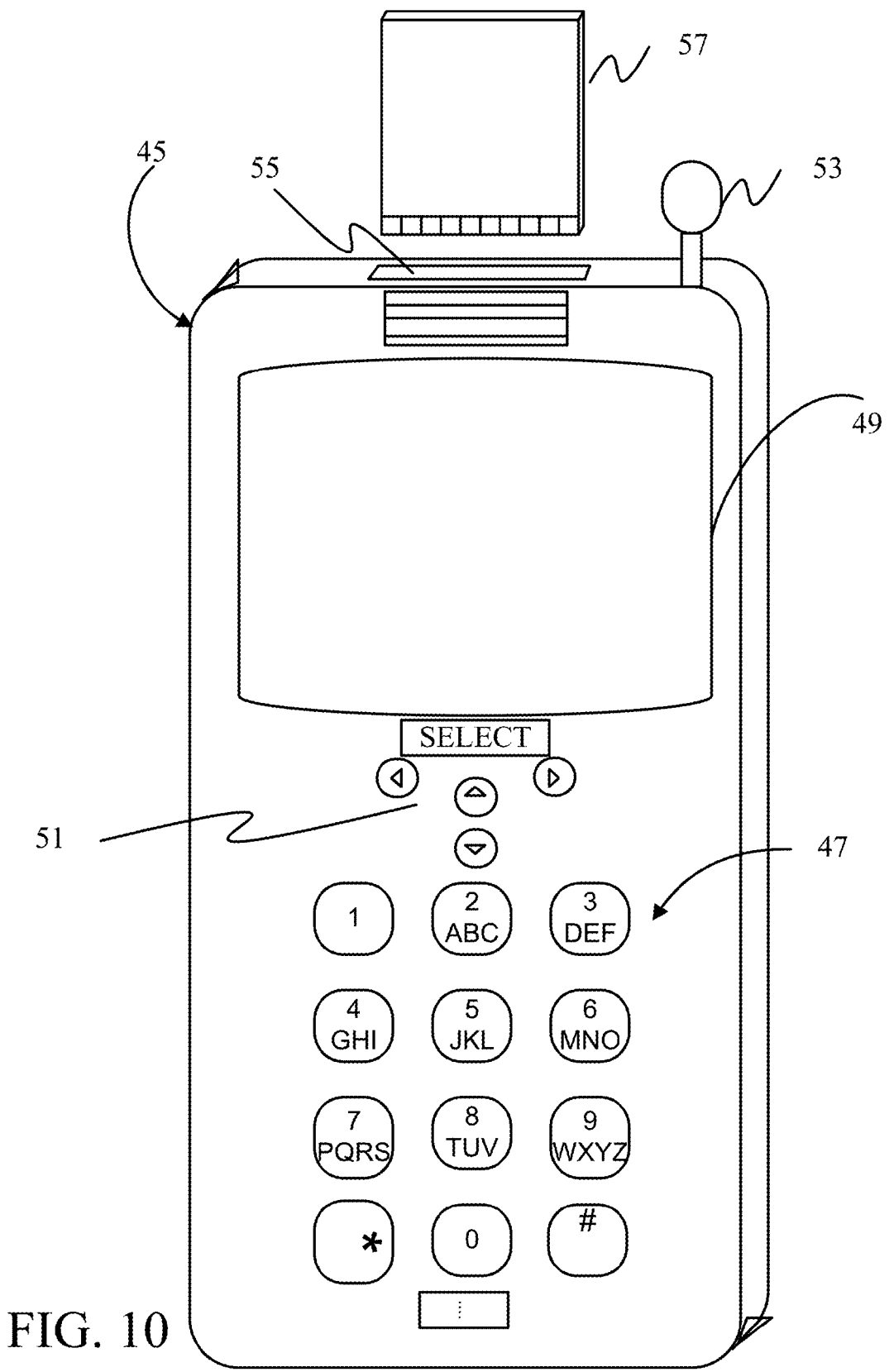
Figure 11:
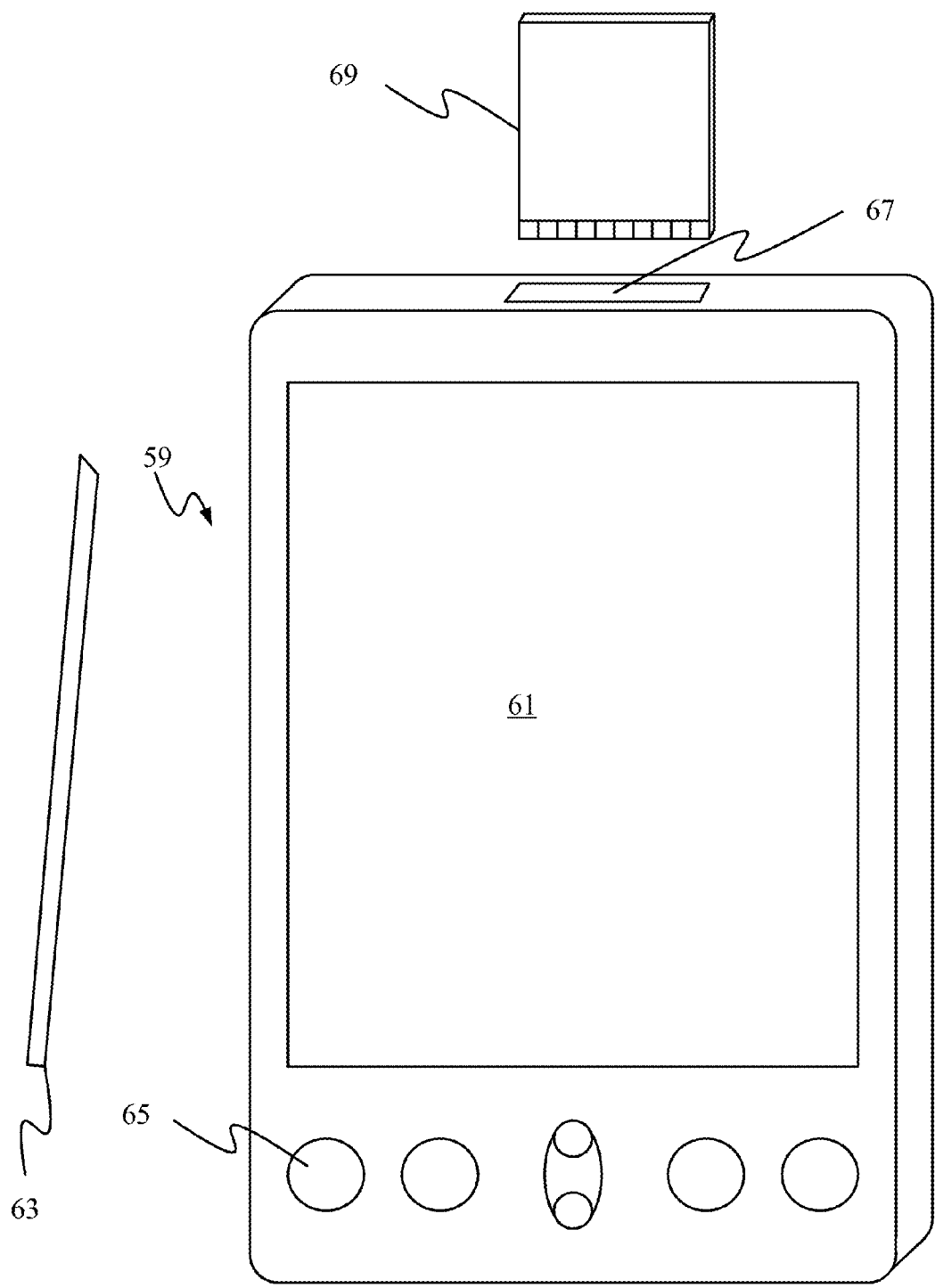

FIGS. 10 and 11 provide additional examples of devices 16 that can be used, although others can be used as well. In FIG. 10, a smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1×rtt, and Short Message Service (SMS) signals. In some embodiments, phone 45 also includes a Secure Digital (SD) card slot 55 that accepts a SD card 57.

The mobile device of FIG. 11 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Note that other forms of the devices 16 are possible.

Figure 12:
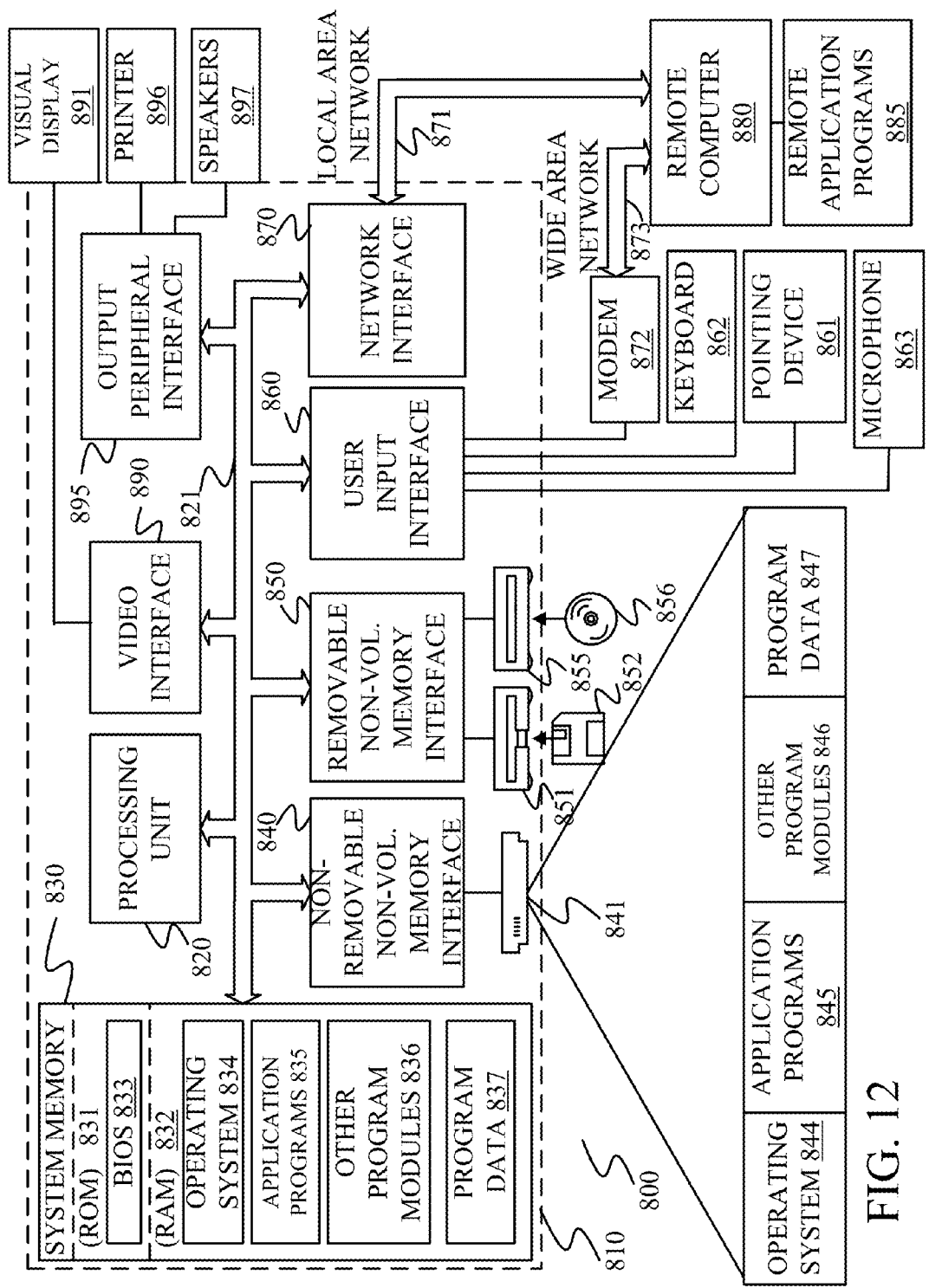
FIG. 12 shows an illustrative computing environment.

FIG. 12 is one embodiment of a computing environment in which system 100 (for example) can be deployed. With reference to FIG. 12, an exemplary system for implementing some embodiments includes a general-purpose computing device in the form of a computer 810. Components of computer 810 may include, but are not limited to, a processing unit 820 (which can comprise processor 146, 170, 121 or 125), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 12 can be deployed in corresponding portions of FIG. 12.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 12 illustrates operating system 834, application programs 835, other program modules 836, and program data 837.

The computer 810 may also include other removable/non-removable volatile/nonvolatile computer storage media. By way of example only, FIG. 12 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 12, provide storage of computer readable instructions, data structures, program modules and other data for the computer 810. In FIG. 12, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 12 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 12 illustrates remote application programs 885 as residing on remote computer 880. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of moving shared data, stored in a shared data system at a first location and accessible by a plurality of different user devices, from the first location to a second location, the method comprising:
    generating, by a first user device, a user interface display that is displayed on the first user device and includes one or more user input mechanisms, wherein the one or more user input mechanisms comprises a data identifier user input mechanism;
    receiving a user input through the data identifier user input mechanism on the first user device;
    based on the user input received through the data identifier user input mechanism, identifying, using a data move component on the first user device, the shared data to be moved;
    identifying, using the data move component on the first user device, the second location;
    generating, using the data move component on the first user device, a first object that comprises:
        location metadata identifying the second location; and
        move status metadata that indicates a status of moving the identified shared data from the first location to the second location;
    sending, using the data move component on the first user device, the first object from the first user device to the shared data system for storage at the first location; and
    moving, using the data move component on the first user device, the identified shared data from the first location to the second location.

2. The computer-implemented method of claim 1 wherein the one or more user input mechanisms comprises a location identifier user input mechanism, the method further comprising:
    receiving a user input through the location identifier user input mechanism and, in response, identifying the second location where the shared data is to be moved.

3. The computer-implemented method of claim 2 wherein the user interface display comprises a data move user input mechanism, the method further comprising:
    receiving a user input through the data move user input mechanism; and
    in response to the user input through the data move user input mechanism, initiate moving the identified shared data from the first location to the second location.

4. The computer-implemented method of claim 1 wherein the identified shared data comprises a plurality of individually movable data portions and wherein moving comprises:
   determining, using the data move component on the first user device, whether any of the individually movable data portions still need to be moved;
   if so, selecting, using the data move component on the first user device, an individually movable data portion; and
   moving, using the data move component on the first user device, the selected, individually movable data portion from the first location to the second location.

5. The computer-implemented method of claim 4 wherein moving comprises:
   determining, by the first user device, that all of the individually movable data portions are moved to the second location; and
   based on the determination,
      using the data move component on the first user device to change a location identifier corresponding to the identified shared data, on the first user device, from the first location to the second location; and
      updating the first object, stored at the first location, to indicate that all of the individually movable data portions are moved to the second location.

6. The computer-implemented method of claim 5 wherein the shared data comprises at least a portion of a notebook with folders and files and wherein the individually moveable data portions comprise portions of the notebook.

7. The computer-implemented method of claim 1 wherein the first object is generated and stored in the first location before the identified shared data is moved from the first location to the second location.

8. The computer-implemented method of claim 7 wherein generating a first object comprises:
   generating, using the data move component on the first user device, the first object with human-readable data that identifies the second location and includes a link to the second location.

9. The computer-implemented method of claim 1 wherein the move status metadata identifies whether the identified shared data has been completely moved from the first location to the second location.

10. The computer-implemented method of claim 1 wherein generating a first object comprises:
   generating, using the data move component on the first user device, the first object with metadata that identifies a time when the moving the identified shared data was initiated and who initiated the move of the identified shared data.

11. The computer-implemented method of claim 1, and further comprising:
   accessing a second set of shared data at a third location, using the first user device; and
   reading, with the first user device, a second object stored at the third location, the second object including metadata with a fourth location and a move indicator indicating that the second set of shared data is moved from the third location to the fourth location.

12. The computer-implemented method of claim 11 wherein the second set of shared data includes individually movable data portions, the second object includes a move status indicator indicating whether the second set of shared data has been completely moved to the fourth location or whether the second set of shared data is in the process of being moved, and further comprising:
   if the second set of shared data is in the process of being moved, selecting, with the first user device, a next individually movable data portion to be moved and moving the selected individually movable data portion from the third location to the fourth location, using the first user device.

13. A client device, comprising:
   a user interface component configured to generate a user interface display with one or more user input mechanisms, wherein the one or more user input mechanisms comprises a data identifier user input mechanism that receives a data identifier user input;
   a client application configured to access, and interact with, shared data at a first location in a shared data system, the shared data comprising a plurality of individually movable data portions;
   a data move component configured to:
      based on the data identifier user input, identify the shared data to be moved;
      identify a second location for the shared;
      generate a tombstone object that comprises location metadata identifying the second location for the shared data and move status metadata that indicates a status of moving the identified shared data from the first location to the second location;
      send the tombstone object from the client device to the shared data system for storage at the first location in the shared data system;
      move the shared data from the first location in the shared data system to the second location by
         determining whether any of the individually movable data portions still need to be moved and, if so, selecting an individually movable data portion and moving the selected, individually movable data portion from the first location to the second location; and
   a computer processor being a functional part of the client device and activated by the user interface component, the client application and the data move component to facilitate generating user interface displays, accessing and interacting with the shared data, and moving the shared data to the second location.

14. The client device of claim 13 wherein the data move component is configured to receive a user input to access a second set of shared data at a third location and to read a second tombstone object identifying a fourth location for the second set of shared data, the data move component configured to modify the client device to access the second set of shared data at the fourth location.

15. The client device of claim 14 wherein the second tombstone object includes a move status indicator indicating whether the second set of shared data has been completely moved to the fourth location or whether the second set of shared data is in the process of being moved.

16. The client device of claim 15 wherein if the second set of shared data is in the process of being moved, the data move component is configured to identify a next portion of the second set of shared data that is to be moved to the fourth location and to provide outputs to move the identified next portion of the second set of shared data to the fourth location, and wherein when the client device moves a last portion of the second set of shared data to the fourth location, the client device is configured to update the move status indicator.

17. A computer-implemented method comprising:
   generating, by a user computing device, a user interface display that is displayed on the user computing device and includes one or more user input mechanisms, wherein the one or more user input mechanisms comprises a data identifier user input mechanism and a second location identifier user input mechanism;

based on a user input received through the data identifier user input mechanism, identifying shared data at a first location in a shared data system;

based on a user input received through the second location identifier user input mechanism, identifying a second location in the shared data system to which to move the shared data;

generating an object with the user computing device, the object comprising location metadata identifying the second location and having human-readable data that identifies the second location and includes a link to the second location, and the object comprising move status metadata that indicates a status of moving the identified shared data from the first location to the second location;

sending the object from the user computing device to the shared data system for storage at the first location;

generating a data move user input mechanism to receive a user input to begin moving the identified shared data from the first location to the second location; and in response to receiving the user input at the data move user input mechanism, initiating a data move operation, with the user computing device, to move the identified shared data from the first location to the second location, wherein the user computing device performs the data move operation by retrieving a portion of data at the first location and providing the portion of data to the shared data system for storage at the second location.

* * * * *